Jan. 5, 1932.                B. GROSSBARD                1,839,670

ADJUSTABLE TRANSMISSION APPLIANCE

Filed March 14, 1928

INVENTOR.
BARNET GROSSBARD
BY
*J.E. Trabucco*
ATTORNEYS.

Patented Jan. 5, 1932

1,839,670

UNITED STATES PATENT OFFICE

BARNET GROSSBARD, OF SAN FRANCISCO, CALIFORNIA

ADJUSTABLE TRANSMISSION APPLIANCE

Application filed March 14, 1928. Serial No. 261,691.

This invention relates to improvements in transmission appliances of the kind used for transmitting power from a power driven shaft to a mechanism to be operated.

An object of my invention is to provide a transmission appliance having a construction adapted to fit motors of various sizes.

Another object of my invention is to provide a transmission appliance having a construction wherein the loss of power resulting from friction is reduced to a minimum.

Another object of my invention is to provide a transmission appliance embodying a construction adapted to support a motor as well as a clutch mechanism for transmitting motion from the motor to a machine to be operated, the appliance being so constructed as to permit the motor and clutch mechanism to be attached to the machine as a unit.

A further object of my invention is to provide a transmission appliance embodying a novel clutch mechanism for transmitting rotary motion from a driving wheel to a fly wheel revolvably mounted on a stationary shaft.

Other objects more or less apparent will present themselves or will be specifically pointed out in the description to follow.

Figure 1:
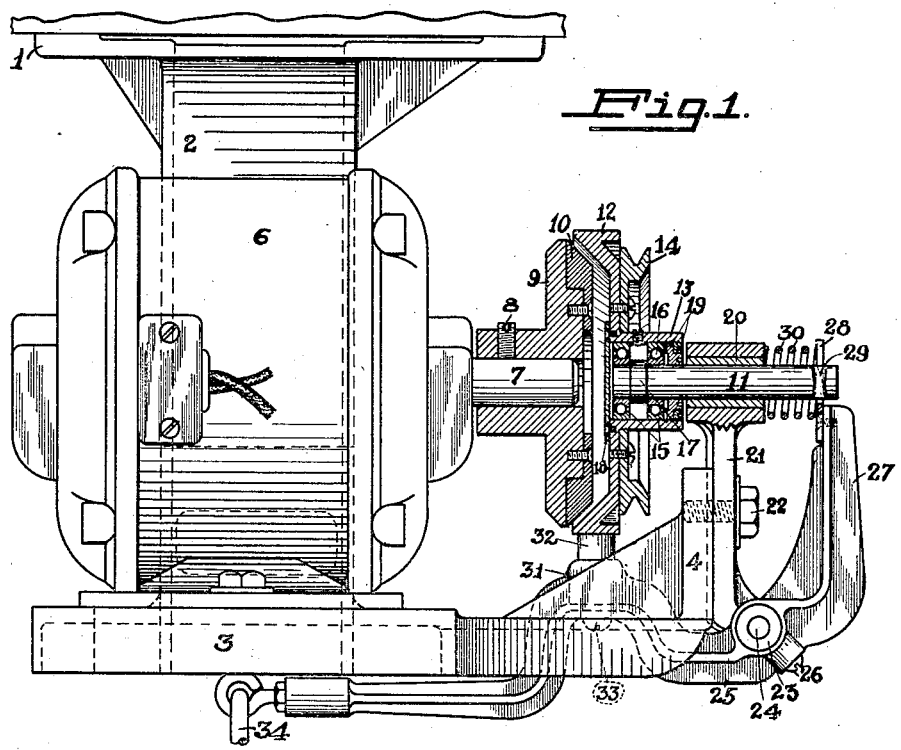
Figure 2:
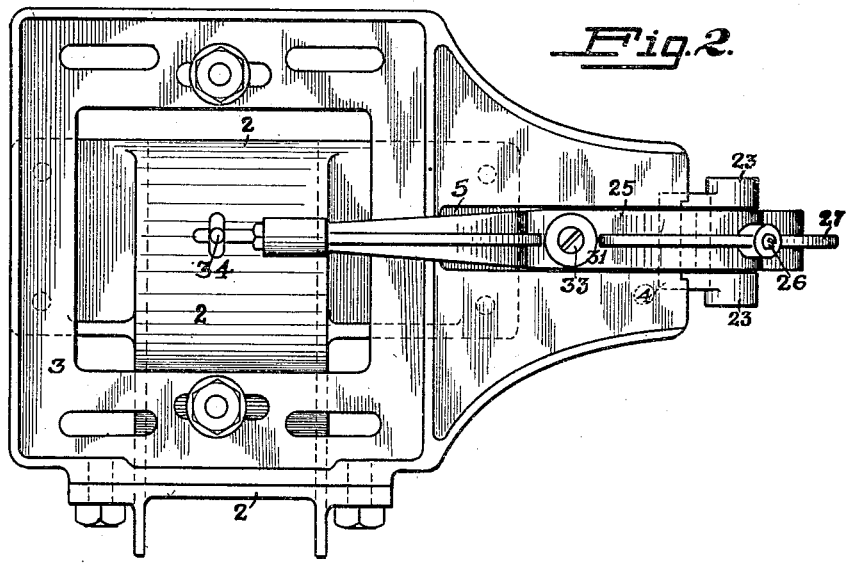

In the accompanying drawings showing the preferred embodiment of my invention,

Fig. 1 is a side view of my improved transmission appliance showing a part thereof broken away and the clutch mechanism in cross section; and Fig. 2 is a bottom view of the supporting structure of my transmission appliance.

Referring to the drawings, the numeral 1 represents a top member attachable by bolts or screws to the supporting structure of a machine to be operated. The top member is secured to or is formed integrally with a downwardly extending curved leg 2 which is attached at its end by bolts or screws to a horizontally disposed support 3. The support 3 is provided at one of its ends with an upright member 4 and with an elongated slot 5 which commences at a point adjacent the upright member and extends for a distance toward the opposite end of the support.

Resting on the support 3 and attached thereto as by bolts, is a motor 6 which is provided with a shaft 7. Detachably secured to the shaft as by a set screw 8 is a wheel 9 having a beveled gripping pad 10 secured to its inner surface by suitable means such as screws.

Revolvably mounted on a shaft 11 which is not adapted to turn, is a fly wheel 12 having a circular projection 13 extending therefrom and around the shaft but in spaced relation to the latter. Secured to the fly wheel as by screws, is a wheel 14 over which may be positioned an endless belt for attachment to a machine to be operated. Located between the circular projection 13 and the shaft 11 is a bearing member comprised of two separated pairs of rings 15 having ball bearings 16 movably positioned between them. The shaft 11 is provided with a collar 17 which serves to maintain the pairs of rings 15 in separated positions, while a metal plate 18 secured to the fly wheel 12 at a point opposite the end of the shaft serves to prevent one pair of the rings from being removed from its position around the shaft. The other pair of rings is maintained in position around the shaft by two co-operating ring shaped nuts 19 which are screwed into the end of the circular projection 13.

The shaft 11 is slidably located inside a bushing 20, and the bushing, shaft and fly wheel are adjustably supported on the upright member 4 by a bar 21. The bar 21 is provided with a vertically disposed slot, and a screw 22 extends through the latter and enters a threaded hole located in the member 4, thereby providing adjustable means for lowering and raising the fly wheel 12 to position it in proper operating positions for motors of different sizes.

The bar 21 is provided at its lower end with two separated projections 23, and pivotally attached to the projections as by a pin 24 is a lever member 25. A set screw 26 extending into the lever member and against the pin 24 serves to prevent the latter from becoming detached from the projections 23.

The lever member is provided with an upwardly extending part 27 having a forked end 28 which extends through two slots 29 located in the end of the shaft 11. Located around the end part of the shaft 11 with one of its ends bearing against the forked end 28 of the lever member and its other end bearing against the circular part of the bar 21, is a spiral spring 30 which tends to force the forked end 28 outwardly to prevent the wheel 12 from contacting with the gripping pad 10 of the driving wheel 9.

The lever member 25 curves upwardly as at 31, within the slot 5, and is provided thereon with a pad 32 which may be adjusted through a set screw 33. The pad serves to stop the rotary motion of the fly wheel 12 by its contact therewith when the horizontally extending part of the lever member 25 is moved upwardly by the pressure of the spring 30 against the forked end 28 of the said lever member.

An operating rod 34 attached to the end of the lever member 25 when pulled downwardly moves the lever member on its pivot 24, thereby moving the upwardly extending part 27 and the forked end 28 inwardly. The movement of the forked end against the sides of the slot 29, forces the shaft 11 and the fly wheel 12 toward the driving wheel 9, thereby bringing the said fly wheel into contact with the gripping pad 10. The fly wheel upon contacting with the gripping pad 10 is rotated through its bearings on the shaft 11. Upon releasing the downward pull on the operating rod 34 the spring 30 forces the forked end 28 outwardly against the sides of the slot 29, thereby causing the said forked end to carry with it the shaft 11 and the fly wheel 12.

It will be observed that the motor and transmitter may be detached as a unit from the leg 2 by unfastening the bolts securing the support 3 to the leg. Through the adjustment of the position of the bar 21 on the upright member 4, the fly wheel 12, the lever 25, the shaft 11 and the pad 32 may be moved as a unit, thereby providing a novel transmission construction which can be readily adjusted to fit motors of different sizes. The forked end 28 of the lever member 27, being located in the slots 29 of the shaft 11, prevents the latter from revolving with the fly wheel 12.

Having described my invention, what I claim is:

1. A transmission appliance comprising a motor having a driving shaft, a driving wheel on said shaft; an axially movable, non-revolvable shaft, a bearing on said non-revolvable shaft, a driven wheel on said bearing, a unitary frame for supporting said driving shaft and said non-revolvable shaft in axial alignment, a lever pivotally connected to said frame and in engagement with said non-revolvable shaft for axially moving said non-revolvable shaft whereby said wheels are brought into driving contact, said lever serving to prevent rotational movement of said axially movable shaft, a brake on said lever; said brake being adapted to be moved into engagement with said driven wheel, and a spring on said non-revolvable shaft in engagement with said lever for constraining axial movement of said last named shaft and for urging said brake into engagement with said driven wheel.

2. A transmission appliance comprising a motor having a driving shaft, a driving wheel on said shaft; an axially movable, non-revolvable shaft, a bearing on said non-revolvable shaft, a driven wheel on said bearing, a unitary frame for supporting said driving shaft and said non-revolvable shaft in axial alignment, means for adjustably positioning said axially movable shaft relative to said frame, a lever pivotally connected to said frame and in engagement with said non-revolvable shaft for axially moving said non-revolvable shaft whereby said wheels are brought into driving contact, said lever serving to prevent rotational movement of said axially movable shaft, a brake on said lever; said brake being adapted to be moved into engagement with said driven wheel, and a spring on said non-revolvable shaft in engagement with said lever for constraining axial movement of said last named shaft and for urging said brake into engagement with said driven wheel.

BARNET GROSSBARD.